United States Patent Office 3,542,822
Patented Nov. 24, 1970

3,542,822
HYDROLYSIS OF NITRILES TO CARBOXYLIC ACIDS
Charles M. Starks, Ponca City, Okla., assignor to Continental Oil Company, Ponca City, Okla., a corporation of Delaware
No Drawing. Filed May 27, 1968, Ser. No. 732,066
Int. Cl. C08h 17/36
U.S. Cl. 260—413                10 Claims

ABSTRACT OF THE DISCLOSURE

A process for hydrolyzing organic nitriles to carboxylic acids comprising carrying out the hydrolysis with aqueous hydrochloric acid or aqueous sulfuric acid in the presence of an organic-soluble strong acid catalyst such as a sulfonic acid, a carboxylic acid substituted by F, Cl, $NO_2$, COOH or other electron withdrawing group, or a phosphonic acid.

DISCLOSURE

This invention relates to a process for hydrolyzing organic nitriles to carboxylic acids and more particularly to carrying out said hydrolysis with a strong aqueous acid in the presence of an organic-soluble acid catalyst.

The hydrolysis of nitriles to carboxylic acids is well known to readily occur with strong acids such as hydrochloric or sulfuric acid in which the nitrile is partially soluble. When the organic portion of the nitrile is fairly large, about 5 or more carbon atoms, the nitrile becomes only slightly soluble, even at high temperatures. Consequently, the hydrolysis of such long chain nitriles must be conducted at relatively high reaction temperatures (greater than 150° C.) or for long periods of time (24 or more hours). Under these conditions side reactions occur which lower the purity and yield of the carboxylic acid produced.

Hydrolysis of nitriles with aqueous hydrochloric acid is difficult because the nitrile is even less soluble in aqueous hydrochloric acid than in sulfuric acid, and in addition the hydrochloric acid has a tendency to evaporate from the reaction mixture so that the practical operating temperature is only about 60–70° C. at atmospheric pressure.

It has now been unexpectedly discovered that the use of an organic soluble strong acid such as a sulfonic acid, a F, Cl or $NO_2$ substituted carboxylic acid, or a phosphonic acid catalyzes the nitrile hydrolysis such that aqueous hydrochloric acid or aqueous sulfuric acid can be used to hydrolyze nitriles having 5 or more carbon atoms.

Broadly, the nitriles suitable for use as starting materials in accordance with this invention include:

(a) 1-cyanoalkanes such as RCN, where R has at least 5 carbons. There is essentially no upper limit on the number of carbon atoms; however, the larger the number of carbon atoms the greater the amount of organic acid catalyst required;
(b) Branched chain alkyl cyanides,

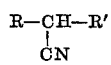

where R+R' total at least 5 carbons;
(c) Aryl cyanides and aralkyl cyanides such as phenyl acetonitrile and phenyl acetonitriles substituted in the phenyl group or at the benzyl carbon;
(d) Alkoxy propionitriles, $ROCH_2CH_2CN$, such as those prepared by addition of alcohols to acrylonitrile; and
(e) Di- and polycyano compounds such as succino nitrile, adiponitrile, o-, m-, and p-di-cyanobenzene, telomers and polymers of acrylonitrile and methacrylonitrile.

The organic acid catalysts found suitable for this process include:

(a) Sulfonic acids $RSO_3H$
(b) Substituted carboxylic acids $R—CX_2CO_2H$ and $R—CHXCO_2H$, where X=F, Cl, $NO_2$, etc.
(c) Phosphonic acids

The R groups may be alkyl, aryl, aralkyl or other radicals, just as long as it is of sufficient composition to make the catalyst soluble in the organic phase of the reaction mixture.

Sulfonic acids which can be used include alkylbenzene sulfonic acids such as dodecylbenzene sulfonic acid and heavy alkylbenzene sulfonic acids such as those used in the manufacture of oil soluble detergents.

Substituted carboxylic acids which can be used include those wherein the substituents increase the pKa of the acid. Such substituents may be F, Cl, $NO_2$, COOH, or other electron withdrawing groups. Specific examples are $\alpha,\alpha$-dichlorocarboxylic acids, $\alpha,\alpha$-difluorocarboxylic acids, $\alpha$-fluorocarboxylic acids, and alkyl substituted succinic or maleic acids.

Phosphonic acids which can be used include alkyl or aryl phosphonic acids or polyphosphonic acids where the alkyl group is big enough to make the acid organic soluble.

The aqueous acid concentration range suitable for this process is from about 5 to about 100 percent acid. The most desirable concentration will depend on the particular acid used. For example, with hydrochloric acid the higher the concentration the lower the boiling point, the lower the solubility of byproduct ammonium chloride will be in the acid and the more corrosive the acid will be. For hydrochloric acid the most desirable concentration is about 20 to 30 percent HCl in water. For sulfuric acid, the boiling point is high enough that this is not a factor, but corrosiveness is. Moreover, concentrated sulfuric acid, particularly hot sulfuric acid, promotes a number of side reactions which will lower the product yield. For sulfuric acid the most desirable concentration is about 5 to about 20 percent $H_2SO_4$ in water. It is to be noted that the aqueous acid concentration does not affect the rate of hydrolysis of nitriles since the hydrolysis reaction takes place in the organic phase or at the organic aqueous interface.

The organic acid catalyst concentration range is about 0.01 to about 25 percent. The most desirable range depends on how fast the reaction needs to be. The higher the catalyst concentration the faster the reaction will proceed.

Temperatures can vary between about 25 and about 200° C., depending on catalyst type and on ease of nitrile hydrolysis. Preferred temperature is typically about 100° C. to get rapid rate of reaction but still avoiding unwanted side reactions.

The reaction times can vary over a fairly wide range depending on all the other factors such as organic acid concentration, reaction temperature and on the particular material being hydrolyzed. This reaction time normally ranges between about 0.1 to about 10 hours.

The following example illustrates a typical reaction using the process of this invention.

EXAMPLE

A mixture of 50 g. of 1-cyanodecane and 100 ml. of 37% hydrochloric acid in water was heated under reflux (65° C.) and stirring for a total of 7 hours. During this time samples were withdrawn from the organic layer and examined by infrared spectroscopy. No reduction in the nitrile band absorbance (at 2250 cm.$^{-1}$) and no appearance of a carbonyl band (expected at about 1700 cm.$^1$) was observed, indicating that no hydrolysis of the nitrile to carboxylic acid had taken place.

Two and one-tenth grams of a sulfonic acid (prepared by alkylation of benzene with $C_{12}$ to $C_{14}$ chloroparaffins, followed by sulfonation to produce an alkylbenzene sulfonic acid) was added to the reaction mixture and refluxing was continued as above. After one hour approximately 50% of the nitrile had been hydrolyzed to undecanoic acid as determined by infrared spectra. After four hours all of the nitrile had been hydrolyzed as determined by the complete disappearance of the CN band at 2250 cm.$^{-1}$, and the appearance of a large band at 1705 cm.$^{-1}$, and the broad band at 2800–3200 cm.$^{-1}$, characteristic of carboxylic acids. Distillation of the product gave undecanoic acid, boiling point 135–140° C. at 1 mm. Hg pressure.

Thus, in the example it is shown that refluxing a mixture of 1-cyanodecane and hydrochloric acid for seven hours produces no hydrolysis of the nitrile; however, after the addition of a catalytic amount of nitrile-soluble sulfonic acid, the hydrolysis is complete in four hours.

Having thus described the invention by providing a specific example, it is to be understood that no undue limitations are to be drawn by reason thereof.

What is claimed is:

1. In a process for hydrolyzing organic nitriles of five or more carbon atoms to carboxylic acids, the improvement which comprises reacting the nitrile with an aqueous solution of hydrochloric acid or sulfuric acid in the presence of the organic nitrile-soluble acid $RSO_3H$, wherein R is alkyl, aryl or aralkyl.

2. The process of claim 1 wherein the organic nitrile is a 1-cyanoalkane.

3. The process of claim 1 wherein the aqueous acid concentration is from about 5 to about 100 percent.

4. The process of claim 1 wherein the aqueous hydrochloric acid concentration is from about 20 to about 30 percent.

5. The process of claim 1 wherein the aqueous sulfuric acid concentration is from about 5 to about 20 percent.

6. The process of claim 1 wherein the organic nitrile soluble acid concentration varies from about 0.01 to about 25 percent.

7. The process of claim 1 wherein the temperature of the reaction varies from about 25 to about 200° C., and the reaction time varies from about 0.1 to about 10 hours.

8. The process of claim 1 wherein the temperature of the reaction is about 100° C.

9. The process of claim 1 wherein the organic nitrile-soluble catalyst is an alkylbenzene sulfonic acid.

10. The process of claim 1 wherein the organic nitrile-soluble catalyst is dodecylbenzene sulfonic acid.

References Cited

UNITED STATES PATENTS 3,320,305   5/1967   Wiese _____ 260—486

OTHER REFERENCES

Migrdichian, V., Organic Synthesis, 1957, pp. 426–428.

LEWIS GOTTS, Primary Examiner

ETHEL G. LOVE, Assistant Examiner

U.S. Cl. X.R.

260—515, 526, 535, 537, 540